(No Model.)
A. M. SHURTLEFF.
NIPPLE HOLDER AND SUPPORT THEREFOR.
No. 597,513. Patented Jan. 18, 1898.
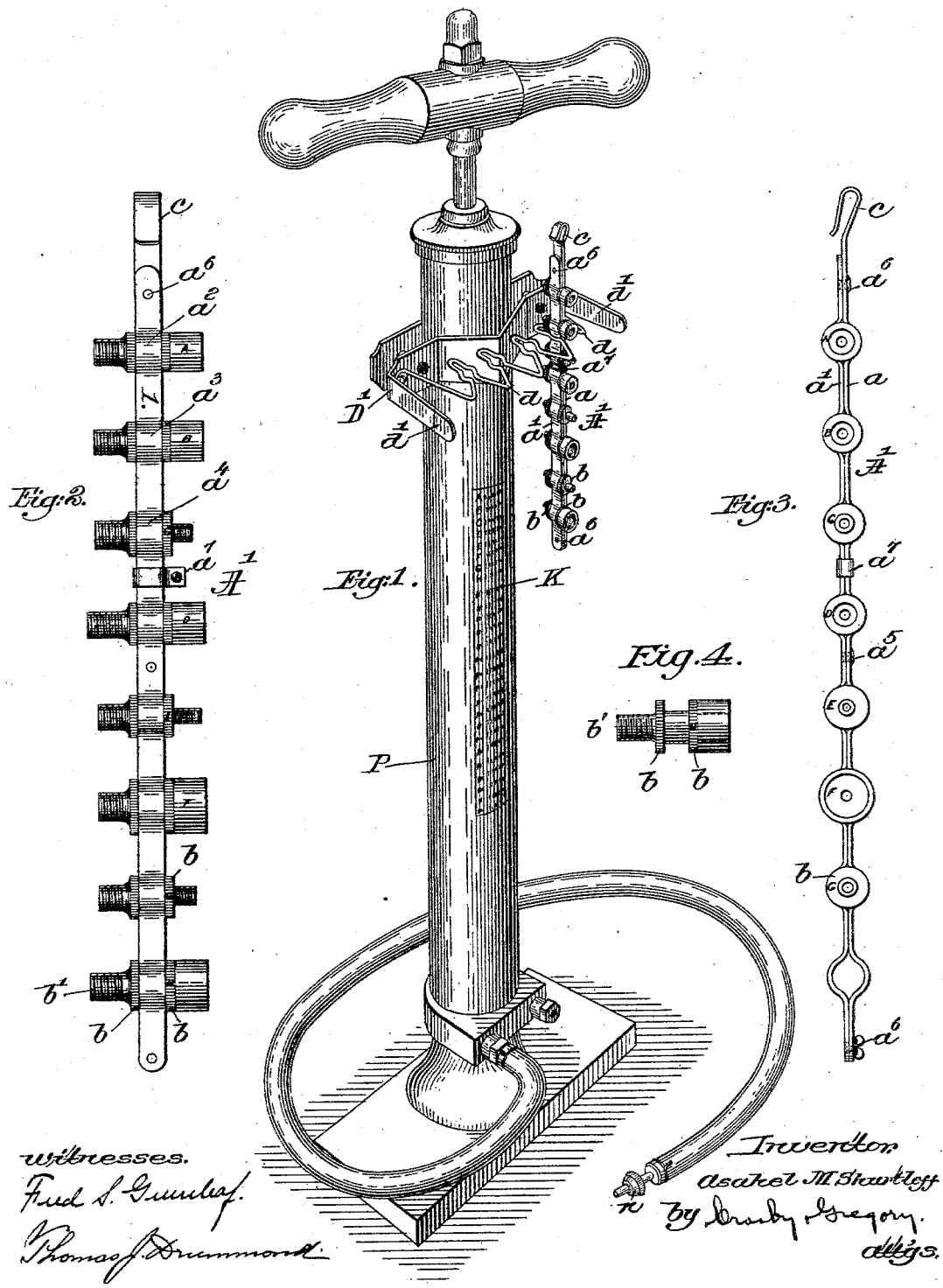

UNITED STATES PATENT OFFICE.

ASAHEL M. SHURTLEFF, OF BOSTON, MASSACHUSETTS.

NIPPLE-HOLDER AND SUPPORT THEREFOR.

SPECIFICATION forming part of Letters Patent No. 597,513, dated January 18, 1898.

Application filed June 3, 1896. Serial No. 594,144. (No model.)

*To all whom it may concern:*

Be it known that I, ASAHEL M. SHURTLEFF, of Boston, county of Suffolk, State of Massachusetts, have invented an Improvement in Nipple-Holders and Supports Therefor, of which the following description, in connection with the accompanying drawings, is a specification, like letters on the drawings representing like parts.

My invention relates to improvements in bicycle accessories, particularly to a nipple-holder to be used in connection with the ordinary pneumatic bicycle-tire and pump.

Bicycle dealers find it necessary to keep on hand facilities for inflating any of the numerous pneumatic bicycle-tires kept in their stores for sale and that may be brought to them at any time by riders. These different tires are provided with different varieties of inflation-valves, and these require different kinds of nipples for the attachment of the air-pump. Accordingly it is desirable to provide a quick and convenient means for readily attaching the required nipple to the wheel without being obliged to search among a promiscuous lot for the one desired. I have therefore devised a novel holder in which I mount a series of nipples of different sizes and shape, so that by taking the holder in hand any nipple of the series may be easily applied in correct position with relation to the coöperating part in the valve-stem of the particular tire to be inflated, and the said nipple may be rotated in the holder to effect its coupling with the valve-stem. The nipples are so constructed, as will be hereinafter described, that when applied to the holder they are free to be rotated, but they cannot escape from the holder, and they can be removed from the holder only by a manipulation which never occurs in the practical use of the holder. The nipples so held in the holder that they cannot escape absolutely prevents any liability of a nipple of the set being lost or mislaid from the set, and being connected together by the holder the set cannot be accidentally and carelessly put into the pocket and carried off.

A further feature of my invention consists in providing the pump-cylinder with a bracket to receive and support the nipple-holder.

Further details and advantages of my invention will appear in the following description, and will be more definitely pointed out in the accompanying claims.

In the drawings illustrative of my invention, Figure 1 is a perspective view showing my improvements properly mounted on the usual bicycle air-pump. Fig. 2 is a side elevation of the nipples and holder. Fig. 3 is a bottom plan view thereof, the lowermost nipple being omitted in order to more clearly show one of the sockets of the holder. Fig. 4 shows a nipple detached.

In the present embodiment of my invention the nipple-holder A' is shown as composed of two metal strips $a$ $a'$, which are crimped or provided with concavities at suitable intervals to form the sockets $a^2$ $a^3$ $a^4$, &c., throughout the length of the holder, these sockets being adapted to receive the nipples A B C, &c.

While I have herein shown as my preferred form a holder made of metal strips, my invention is in no wise limited to that material, inasmuch as any other suitable material may be employed. Nor is it limited to the strip form, and while I have shown the sockets as formed by crimping both strips, yet it is obvious that the socket might be constituted by an outward crimp or pocket formed in one only of the strips or laterally-extended pieces.

The nipples shown have two annular projections $b$ $b$ with a groove between, the holder entering the groove of the nipple, the projections meeting the edges of the holder and preventing the escape of the nipples therefrom by endwise motion, yet the nipples are not so tightly held by the holder but that they may be easily rotated in the holder when it is desired to engage any one of the series of the nipples with the proper coöperating part in the valve-tube of the tire to be inflated, and while I prefer to provide the nipples with a groove, as described, yet any other suitable or equivalent means to prevent the escape of the nipples endwise between the holder may be substituted without invention.

The two parts of the holder are so made that they may be separated for the reception and removal of the nipples. When the different parts of the holder have been sufficiently closed about or applied to the nipples, said parts are clamped into position by suitable means, herein shown as small set-screws $a^5$ $a^6$, at either end of the holder, and one or more clamping-bands $a^7$ may also be used.

A suitable hook or other hanger $c$ is provided conveniently on some portion of the holder, herein shown as at one end thereof.

In order that the nipples may always be at hand when desired in connection with the air-pump P, I have herein shown a support D′ therefor in the form of a bracket clamped about the cylinder of the pump and carrying at its forward end spring-clips $d$, herein shown as formed by the alternate bends of a single piece of wire fastened at either end to the opposite ends of the support D′. The latter is provided with rigid fenders $d'$ at either end, extending slightly beyond the projecting ends of the spring-clips $d$, these fenders being provided to shield the nipples and holders from injury in case the pump should be accidentally dropped or tipped over.

I provide suitable means for designating the different nipples that are to be used in connection with different varieties of tire-valves, and for this purpose the respective nipples are branded by the letters of the alphabet A B C D, preferably stamped thereon in several places, so that the nipple can readily be classified, and the make of tire with which it is to be used can at once be ascertained from a key K, posted up in some convenient position, preferably on the pump P.

In use when it is desired to inflate a bicycle-tire the proper nipple is selected and is readily held in the precise position desired over the tire-valve by means of the holder grasped by one hand. The nipple is then rotated by the thumb and finger of the other hand, it being perfectly free to rotate in the holder, but not being removable therefrom. It will thus be apparent that the provision of the holder is a decided convenience, even though it be used with but one nipple, inasmuch as the small nipple may be accurately and readily held in precisely the position required while it is being screwed onto the valve-thread of the tire. Having properly secured the correct nipple A, B, or C, &c., to the tire, the air-pump is attached to the free end $b'$ of the nipple by means of the usual loose nut $n$, carried by the hose of the air-pump. The air-pump is then operated in the usual manner.

I have herein shown the holder as arranged for eight nipples, this being a convenient number for handling. Inasmuch, however, as a bicycle dealer requires many more nipples of different makes than this number, it will be necessary to have several holders in connection with the air-pump, and therefore I have provided a plurality of spring-clips to support the same.

The holders may be arranged to carry the nipples in classified groups for convenience of use.

It will be understood that each nipple is free to be rotated in its socket and cannot be removed therefrom without first loosening the clamping means, as $a^5$ $a^6$ $a^7$, and then opening the sockets.

Besides the advantages already mentioned the holders are of decided service in avoiding loss of the individual nipples, as well as waste of time in going to and from a receptacle for single nipples.

The support D′ is preferably secured in position substantially as shown, although, of course, it may be secured against the wall or in any other position desired, and, if preferred, the holders may be caught over suitable prongs or hooks on the brackets or elsewhere by means of their hangers $c$, instead of being supported in the spring-clips, although the provision of both of these supporting means increases the facility of my improved holders.

Having described my invention, what I claim, and desire to secure by Letters Patent, is—

1. A nipple-holder composed of two strips provided each with a series of like concavities, and means to fix the said strips together with their concavities opposed, the said strips with concavities being adapted to retain a series of nipples, substantially as described.

2. A nipple-holder composed of two strips provided each with a series of like concavities, one of said strips having its end turned to constitute a hook, and means to fix the said strips together with their concavities opposed, the said strips with concavities being adapted to retain a series of nipples, substantially as described.

3. A nipple-holder, comprising two longitudinal pieces removably secured together and formed to constitute a plurality of nipple-retaining sockets between their opposing faces, and means to clamp said pieces together, whereby a number of nipples may be held thereby free to rotate but prevented from endwise movement, substantially as described.

In testimony whereof I have signed my name to this specification in the presence of two subscribing witnesses.

ASAHEL M. SHURTLEFF.

Witnesses:
GEO. H. MAXWELL,
FREDERICK L. EMERY.